(12) United States Patent
Tanaka et al.

(10) Patent No.: US 6,334,655 B2
(45) Date of Patent: Jan. 1, 2002

(54) BRAKING CONTROL APPARATUS FOR VEHICLES

(75) Inventors: Wataru Tanaka, Anjo; Toshiaki Hamada, Okazaki; Hirofumi Nitta, Obu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/803,017

(22) Filed: Mar. 12, 2001

(30) Foreign Application Priority Data

Mar. 22, 2000 (JP) ............................. 12-080850

(51) Int. Cl.[7] ................ B60T 8/32; B60T 8/00
(52) U.S. Cl. ................ 303/113.4; 303/114.3
(58) Field of Search ............ 303/113.1–113.4, 303/122.11, 139, 155, 166

(56) References Cited

U.S. PATENT DOCUMENTS

| | | | | |
|---|---|---|---|---|
| 5,816,667 A | * | 10/1998 | Jokic | 303/113.4 |
| 5,833,327 A | * | 11/1998 | Kozakai | 303/113.4 |
| 5,967,624 A | * | 10/1999 | Graber et al. | 303/113.4 |
| 6,033,038 A | * | 3/2000 | Kulkarni et al. | 303/114.3 |
| 6,158,824 A | * | 12/2000 | Yonemura et al. | 303/113.5 |
| 6,164,734 A | * | 12/2000 | Otomo et al. | 303/122.1 |
| 6,183,050 B1 | * | 2/2001 | Ganzel | 303/114.1 |
| 6,193,328 B1 | * | 2/2001 | Feigel et al. | 303/113.4 |
| 6,226,586 B1 | * | 5/2001 | Luckevich et al. | 701/70 |
| 6,238,016 B1 | * | 5/2001 | Soga | 303/122.01 |

FOREIGN PATENT DOCUMENTS

DE  197 03 776  8/1998

* cited by examiner

Primary Examiner—Christopher P. Schwartz
(74) Attorney, Agent, or Firm—Burns, Doane, Swecker & Mathis, LLP

(57) ABSTRACT

A braking control apparatus for vehicles which is capable of generating a braking force in response to a pedal depression force to non-controlled wheels while continuing vehicle stability control. The apparatus generates a brake fluid pressure including a pedal input pressure in response to the pedal depression force and a servo pressure in response to a fluid pressure introduced from a pressure apply unit. A fluid pressure control apparatus supplies brake fluid pressure, an electric control unit controls the braking force of each wheel by driving, and a pedal input pressure estimate portion estimates the pedal input pressure. The electric control unit controls the braking force of the non-controlled wheels during vehicle stability control based on the pedal input pressure estimated by the pedal input pressure estimate portion of the electric control unit.

10 Claims, 8 Drawing Sheets

Fig. 5
(a) 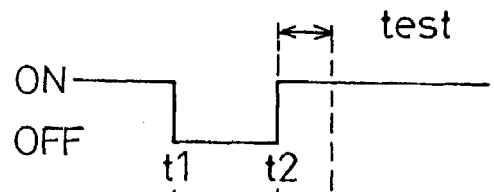
(b) 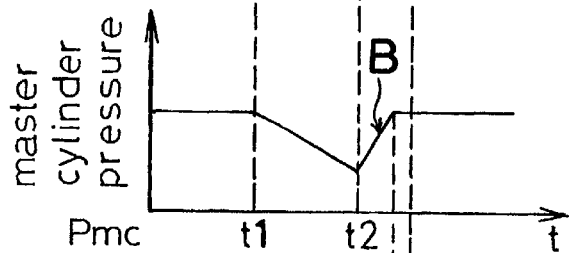
(c) 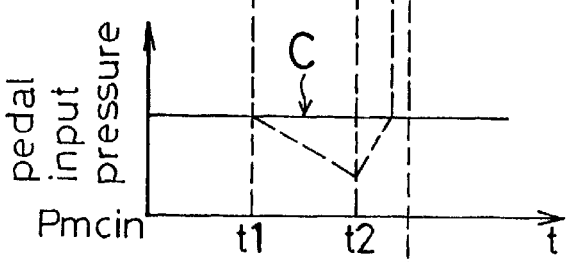
(d) 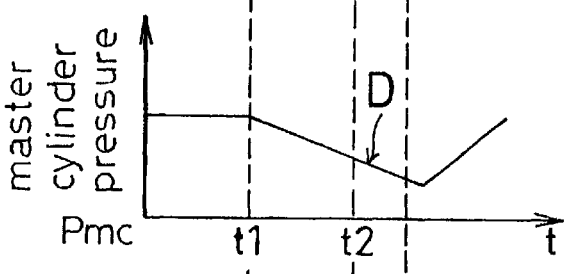
(e) 

Fig. 7
(a)
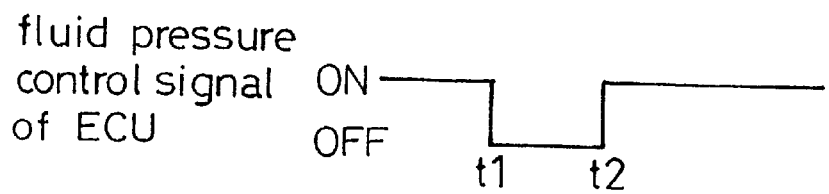
(b)
(c)
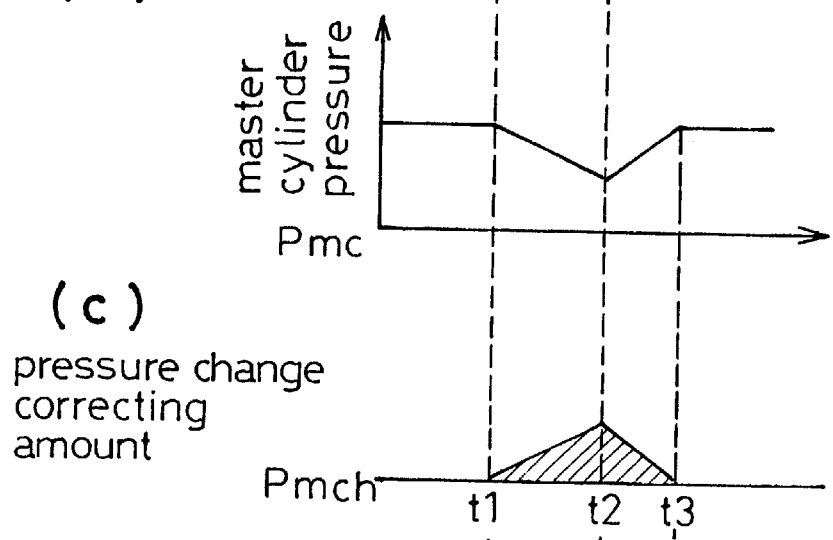
(d)
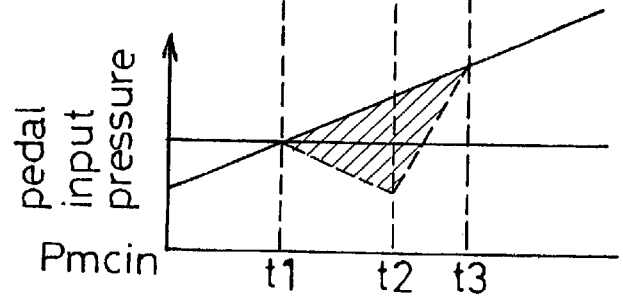
(e)
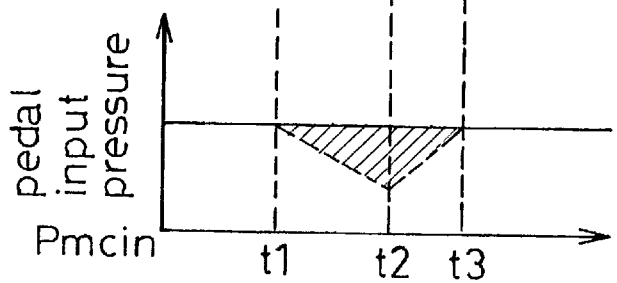

BRAKING CONTROL APPARATUS FOR VEHICLES

This application is based on and claims priority under 35 U.S.C. § 119 with respect to Japanese Application No. 2000-080850 filed on Mar. 22, 2000, the entire content of which is incorporated herein by reference.

FIELD OF THE INVENTION

This invention generally relates to a vehicle braking control apparatus. More specifically, the present invention pertains to a braking control apparatus for vehicles which is able to generate a master cylinder pressure including a first fluid pressure in response to a pedal depression force and a second fluid pressure corresponding to a fluid pressure introduced by a pressure apply device and to control a braking force of each wheel in response to the pedal depression force or a vehicle condition.

BACKGROUND OF THE INVENTION

A known vehicle braking control apparatus is disclosed in German Offenlegungsschrift No. DE 197 03 776 A1. In this apparatus, pressure responsive to the pedal depression force is detected by a pressure sensor and the pedal depression force is amplified by a hydraulic booster and transmitted to the piston of a master cylinder by moving a booster piston by the boosted fluid pressure. When used in vehicle stability control, the boosted fluid pressure is amplified in the hydraulic booster and transmitted to the piston of the master cylinder by introducing the boosted fluid pressure necessary for generating the desired brake fluid pressure to the booster chamber. Accordingly, during the turning of the vehicle, the vehicle stability control is operated by introducing the boosted fluid pressure in response to a vehicle condition. Vehicle stability control refers to the control of the braking force of each wheel in order to decrease the difference between a target running line for the vehicle and an actual running line of the vehicle based on the detected results of the vehicle condition (the amount of the vehicle condition) during steering while the vehicle is turning for instance.

In the known apparatus, brake fluid pressure in response to the pedal depression force is continuously supplied to the wheel brake cylinder of each wheel from the master cylinder. This is because a signal from the pressure sensor takes precedence over the vehicle stability control sensor. Accordingly the vehicle stability control is stopped even when vehicle stability control may still be necessary. That is, the control is stopped in spite of a vehicle condition in which vehicle stability control is still needed. The problem is that the stability of the vehicle is not assured during turning because the vehicle stability control for reducing understeer or oversteer is stopped by the depression of the brake pedal in the case of strong understeering or oversteering during the turning. In other words, the braking force which satisfies a deceleration demand to the non-controlled wheels cannot be generated while continuing the vehicle stability control when a driver needs to decrease the vehicle speed and thus depresses the brake pedal during vehicle stability control.

In light of the foregoing, a need exists for a braking control apparatus for vehicles that is capable of generating a braking force in response to a pedal depression force to the non-controlled wheels while still continuing the vehicle stability control.

SUMMARY OF THE INVENTION

In accordance with one aspect of the invention, a vehicle braking control apparatus includes a fluid pressure generator that generates a brake fluid pressure including a pedal input pressure component in response to a pedal depression force and a servo pressure component in response to fluid pressure introduced by a pressure apply device, a fluid supplying mechanism supplying the brake fluid to wheel cylinders of each wheel from a master cylinder, and a controller controlling the fluid pressure introduced by the pressure apply mechanism in response to a vehicle condition and controlling the braking force of each wheel by driving the fluid supplying mechanism in response to the pedal depression force or the vehicle condition. A pedal input pressure estimating device estimates the pedal input pressure, and the controller controls the braking force of the non-controlled wheels during vehicle stability control based on the pedal input pressure estimated by the pedal input pressure estimate device.

With the present invention, when the brake pedal is depressed during vehicle stability control, the pedal input pressure in response to the pedal depression force is estimated correctly and the braking force of the non-controlled wheels during vehicle stability control is controlled. As a result, the vehicle can be decelerated with a deceleration in response to the pedal depression force. That is, the deceleration does not give any undesirable feeling to the driver even during vehicle stability control.

The vehicle braking control apparatus also includes a fluid pressure sensor detecting the master cylinder pressure of the brake fluid pressure generated in the master cylinder. The pedal input pressure estimating device calculates the servo pressure based on a value of a control signal outputted from the controller to the pressure apply device, and estimates the pedal input pressure by subtracting the calculated value of the servo pressure from that of the master cylinder pressure. The pedal input pressure in response to the amplified pedal depression force is thus estimated correctly based on the value of the control signal outputted to the pressure apply device and the master cylinder pressure detected by the fluid sensor.

The pedal input pressure estimating device holds the estimated value of the pedal input pressure calculated previously when a pressure increase signal increasing the brake fluid pressure of any of the wheel cylinders of the wheels is outputted during vehicle stability control, and the controller controls the braking force of the non-controlled wheels based on the estimated value of the pedal input pressure held previously. Thus, when the pressure increase signal amplifying the brake fluid of any wheel cylinder during vehicle stability is outputted, the estimated value of the pedal input pressure calculated previously is assured. As a result, when the master cylinder pressure starts to decrease by the opening of a holding valve receiving the pressure increase signal and by a fluid amount consumption of the wheel cylinders while the pedal depression force is constant or increasing, a fault judgment in which the pedal input pressure is also decreased can be prevented.

The pedal input pressure estimating device holds the estimated value of the pedal input pressure when the master cylinder pressure detected by the fluid pressure sensor is turned to be increased while a predetermined period is passed from the ending of the outputting of the pressure increase signal, and estimates the value decreased by a predetermined value from the estimated value of the pedal input pressure held previously when the master cylinder pressure continues to decrease. Accordingly, when the master cylinder pressure begins to increase from a decreasing state within a predetermined time from the ending of the pressure increase outputting, the estimated value of the pedal input pressure calculated previously is assured. On the other hand, when the master cylinder pressure continues to decrease within the predetermined time, the pedal input pressure is decreased from the estimated value calculated previously because the pedal depression force is judged to be decreased. As a result, whether or not the brake pedal is still depressed is judged correctly after the pressure increase outputting, and the braking force of the non-controlled wheels can be generated correctly.

The pedal input pressure estimating device increases a pressure change correcting amount added to the estimated value of the pedal input pressure calculated previously when the pressure increase signal is outputted, and decreases the pressure change correcting amount after the ending of outputting of the pressure increase signal. Because the pressure change correcting amount increased or decreased in response to the pressure changing of the master cylinder pressure is added to the pedal input pressure calculated from the master cylinder pressure, the pedal depression force after the correcting can be estimated to the correct value which is not influenced by the pressure changing of the master cylinder pressure.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 5 is a timing chart explaining the operation of the braking control apparatus according to the first embodiment of the present invention;

FIG. 7 is a timing chart explaining the operation of the braking control apparatus according to the second embodiment of the present invention.

DETAILED DESCRIPTION OF THE INVENTION

Figure 1:
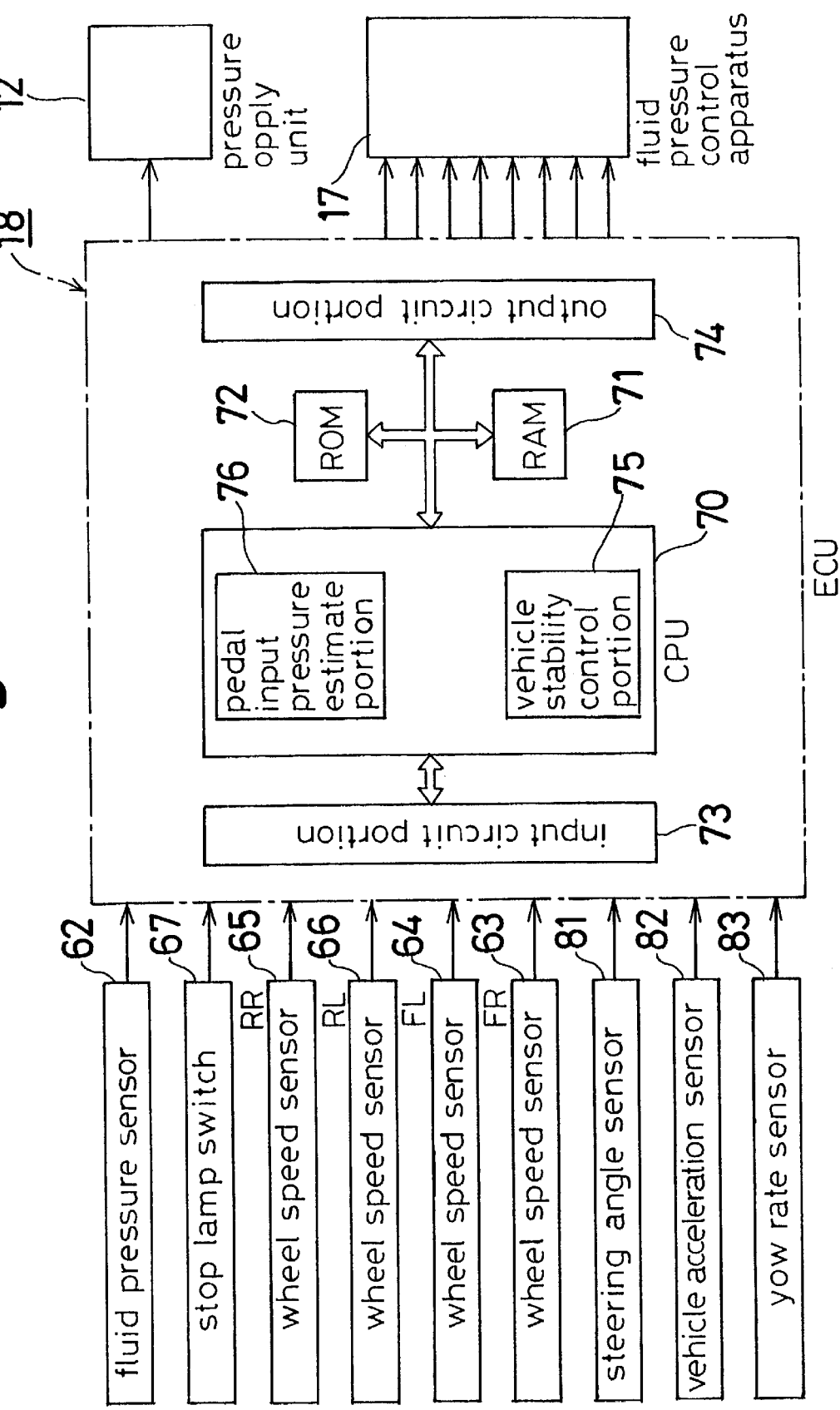
FIG. 1 is a block diagram of the braking control apparatus according to a first embodiment of the present invention.
Figure 2:
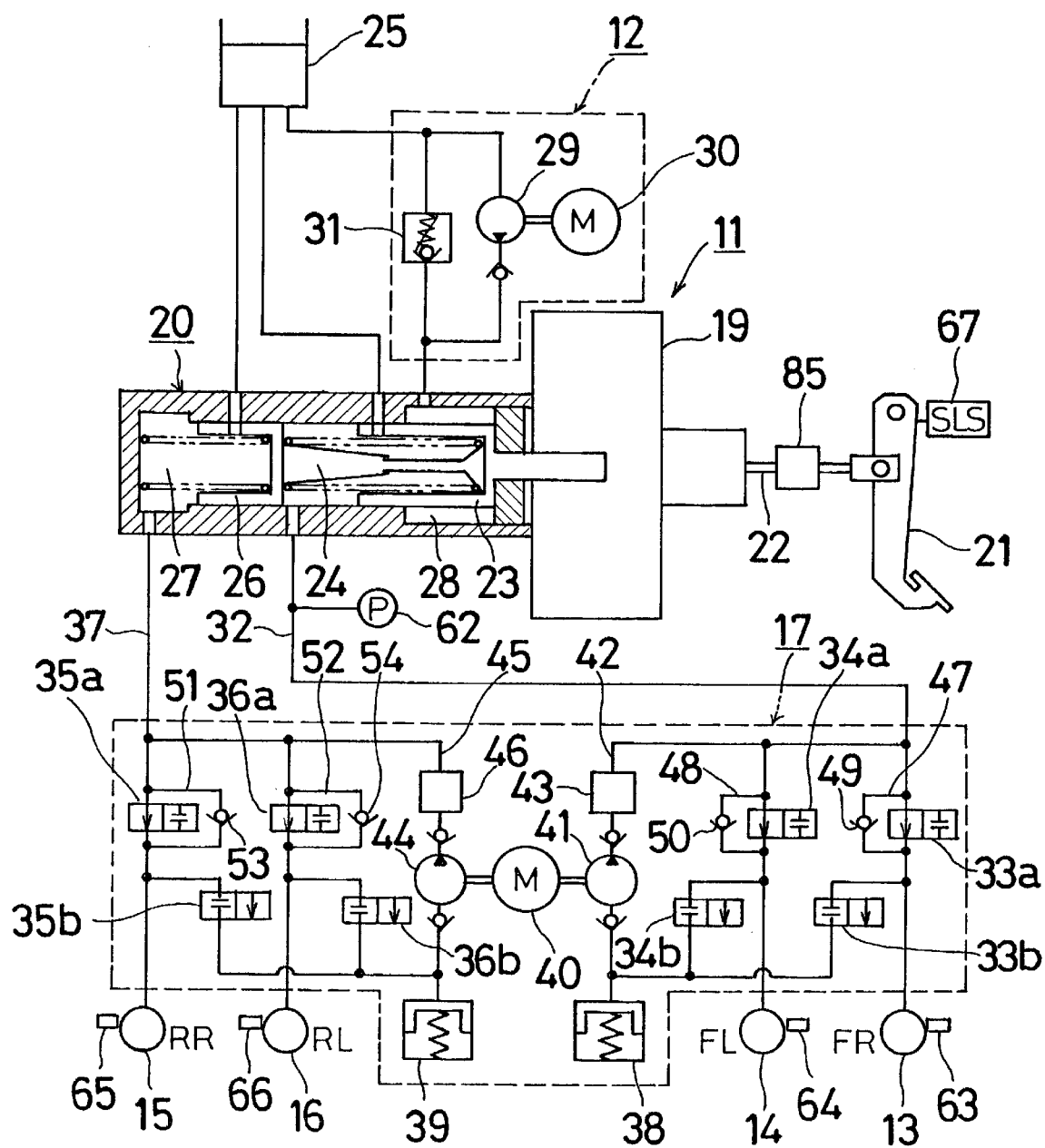
FIG. 2 is a schematic illustration of the overall braking system embodying the braking control apparatus according to the first embodiment of the present invention.

Referring initially to FIG. 2, the vehicle braking control apparatus of the present invention, which has an automatic pressure apply function, is provided with a fluid pressure generating apparatus 11 that generates brake fluid pressure and a pressure apply unit 12 functioning as a pressure apply device that introduces fluid pressure for automatic pressure application to the apparatus. In addition, the braking control apparatus is provided with a fluid pressure control apparatus 17 supplying the brake fluid pressure to the wheel cylinders 13–16 installed at a front right wheel, a front left wheel, a rear right wheel, and a rear left wheel respectively of a vehicle. Also, the braking control apparatus includes an electric control unit 18 (shown in FIG. 1) functioning as a control device that controls the braking force applied to each wheel.

The fluid pressure generating apparatus 11 is provided with a vacuum booster 19 and a master cylinder 20. For purposes of simplifying the overall illustration and facilitating an understanding of the invention, certain structural characteristics of the master cylinder 20 that are known to persons skilled in the art are omitted from FIG. 2, such as the seal members. In the fluid pressure generating apparatus 11, a pedal depression force of a brake pedal 21 amplified by the lever ratio of a link mechanism is transmitted to an operating rod 22 and the operating rod 22 is pushed by the pedal depression force. The pushing force of the rod 22 is amplified by the vacuum booster 19 and pushes a first piston 23 of the master cylinder 20. When the first piston 23 is pushed against the force of a spring from the position shown in FIG. 2, communication between a first pressure chamber 24 of the master cylinder 20 and a reservoir 25 is cut off and fluid pressure is generated in the first pressure chamber 24.

The master cylinder also includes a second piston 26. When the second piston 26 is pushed by the fluid pressure against the force of a spring from the position shown in FIG. 2, communication between a second pressure chamber 27 and the reservoir 25 is cut off and the fluid pressure is generated in the second pressure chamber 27.

Accordingly, when the first piston 23 is pushed by the pedal depression force amplified by the link mechanism and the vacuum booster 19, a brake pressure corresponding to the pedal input pressure (Pmcin) in response to the pedal depression force in the first pressure chamber 24 is generated. In addition, when the second piston 26 is pushed by the brake fluid pressure in the first pressure chamber 24, a brake fluid pressure is generated in the second pressure chamber 27. Pressure increase by vacuum booster includes pressure increase by the lever ratio of the link mechanism.

The master cylinder 20 is also provided with a third pressure chamber 28 which applies the fluid pressure to the end surface of the first piston 23 on the booster side of the first piston 23. The fluid pressure generated in the pressure apply unit 12 is introduced into the third pressure chamber 28. The brake fluid pressure of the third chamber servo pressure Pmc3 is generated in the first pressure chamber 24 since the first piston 23 is pushed by the fluid pressure (the third chamber pressure P3). In this case, the third chamber servo pressure Pmc3 is given by the third chamber pressure P3 corresponding to the ratio A between the pressure receiving areas of the first piston 23 of the booster side and the anti-booster side.

In this way, the master cylinder pressure (Pmc) generated in the master cylinder 20 includes the pedal input pressure (Pmcin) component in response to the pedal depression force amplified by the vacuum booster 19 and the third chamber servo pressure (Pmc3) component in response to the fluid pressure introduced by the pressure apply unit 12.

The pressure apply unit 12 is composed of a pump 29 which compresses the brake fluid stored in the reservoir 25 and applies it to the third pressure chamber 28, a motor 30 driving the pump 29, and a linear valve 31 that opens in response to the current value of an input signal (control signal) and introduces the brake fluid discharged from the pump 29 to the reservoir 25. In accordance with the control signal (current value) outputted from the electric control unit (ECU) 18 to the linear valve 31, the fluid pressure corresponding to the value of the control signal (the current value) is introduced into the third pressure chamber 28 based on the characteristic of the linear valve 31 between the fluid pressure (P3) and the current value. The introduced fluid pressure is the differential pressure between the pressure of the brake fluid discharged by the pump 29 and the decreased percentage or amount of the pressure in response to the degree of opening of the linear valve 31.

The brake fluid pressure generated in the master cylinder 20 is supplied to each wheel cylinder by way of a front wheel side hydraulic circuit and a rear wheel side hydraulic circuit. That is, the fluid pressure control apparatus 17 which connects between the master cylinder 20 and the wheel cylinders 13–16 of each wheel is longitudinally piped.

More specifically, the brake fluid pressure generated in the first pressure chamber 24 is introduced into a main passage 32. The main passage 32 is connected to the wheel cylinders 13, 14 through the front wheel side circuit portion of the fluid pressure control apparatus 17. The main passage 32 is connected to the wheel cylinders 13, 14 through holding valves 33a, 34a provided in respective passages that branch from the main passage on the way to the wheel cylinders. The passage connecting the wheel cylinder 13 and the holding valve 33a is connected to a reservoir 38 by way of a pressure reducing valve 33b, and the passage connecting the wheel cylinder 14 and the holding valve 34a is connected to the reservoir 38 through a pressure reducing valve 34b.

In a similar manner as that described above, the brake fluid pressure generated in the second pressure chamber 27 of the master cylinder 20 is introduced into the main passage 37. The main passage 37 is connected to the wheel cylinders 15, 16 by way of the rear wheel side circuit of the fluid pressure control apparatus 17. That is, the main passage 37 is connected with the wheel cylinders 15, 16 by way of respective holding valves 35a, 36a provided in respective passages that branch from the main passage 37 on the way to the wheel cylinders. A passage connecting the wheel cylinder 15 and the holding valve 35a is connected with a reservoir 39 through a pressure reducing valve 35b, and a passage connecting the wheel cylinder 16 and the holding valve 36a is connected with the reservoir 39 through a pressure reducing valve 36b.

The holding valves 33a, 34a, 35a, 36a are normally open solenoid valves and the pressure reducing valves 33b, 34b, 35b, 36b are normally closed solenoid valves. These solenoid valves are excited or energized by the fluid pressure control signal (control current) outputted from the ECU 18.

The function and operation of the holding valve 33a and the pressure reducing valve 33b associated with the front right side wheel is described below. It is to be understood that the function and operation of the other holding valves 34a, 35a, 36a and the other reducing valves 34b, 35b, 36b associated with the other three wheels are similar. When the holding valve 33a is not energized (i.e., the off condition) and the pressure reducing valve 33b is not energized (i.e., the off condition), a pressure increasing condition exists because the wheel cylinder 13 is in communication with the master cylinder 20 and is prevented from communicating with the reservoir 38. In this pressure increasing condition, the brake fluid pressure in the wheel cylinder 13 is increased.

When the holding valve 33a and the pressure reducing valve 33b are both energized (i.e., they are both in the on condition), a pressure decreasing condition exists because the wheel cylinder 13 is in communication with the reservoir 38 and is prevented from communicating with the master cylinder 20. In the pressure decreasing condition, the brake fluid pressure in the wheel cylinder 13 is decreased.

When the holding valve 33a is energized (i.e., the on condition) and the pressure reducing valve 33b is not energized (i.e., in the off condition), the pressure in the wheel cylinder is held because the wheel cylinder 13 is prevented from communicating with both the master cylinder 20 and the reservoir 38. In the pressure holding condition, the brake fluid pressure of the wheel cylinder 13 is maintained without being increased or decreased.

Through operation of the valves in the above-described manner, the braking force applied to each wheel is individually controlled by controlling the brake fluid pressure supplied to each wheel cylinder 13, 14, 15, 16 as a result of changing the fluid pressure control signal (i.e., on or off) outputted to the holding valves and the pressure reducing valves of each wheel from the ECU 18. Hereafter, the output of a pressure increase signal by the ECU refers to the output of the fluid pressure control signal which unenergizes or unexcites the holding valve (which has been energized or excited) of any wheel cylinder under the holding condition.

In the front wheel side circuit of the fluid pressure control apparatus 17, the brake fluid stored in the reservoir 38 is pumped by the motor driven pump 41 and discharged to the up stream passage of the holding valves 33a, 34a by way of two check valves located on opposite sides of the pump 41 and a damper 43, with the check valves and the damper being provided in a pump passage 42.

In the same way, in the rear wheel side circuit of the fluid pressure control apparatus 17, the brake fluid stored in the reservoir 39 is pumped by the motor driven pump 44 and discharged to the up stream passage of the holding valves 35a, 36a by way of two check valves located on opposite sides of the pump 44 and a damper 46, with the check valves and damper being provided in a pump passage 45.

In the front side wheel circuit, return passages 47, 48 are provided for permitting the return of brake fluid from each wheel cylinder 13, 14 into the master cylinder 20 while bypassing the holding valves 33a, 34a. Respective inverse stop valves 49, 50 preventing the back flow of the brake fluid into the wheel cylinders are provided in each return passage 47, 48.

Likewise, in the rear wheel side circuit, return passages 51, 52 are provided for permitting the return of brake fluid from each wheel cylinder 15, 16 into the master cylinder 20 while bypassing the holding valves 35a, 36a. Respective inverse stop valves 53, 54 preventing the back flow of the brake fluid into the wheel cylinders are provided in each return passage 51, 52.

A fluid pressure sensor 62 detecting the master cylinder pressure (Pmc) as a brake fluid pressure generated in the master cylinder 20 is provided in the main passage 32. Wheel speed sensors 63, 64, 65, 66 are operatively associated with each respective wheel FR, FL, RR, RL to detect the wheel speed of each wheel. A stop lamp switch (SLS) 67 operatively associated with the brake pedal 21 operates as a detecting sensor for detecting the depression of the brake pedal 21. The stop lamp switch (SLS) 67 outputs a first signal (e.g., an on signal) if the pedal 21 is depressed and outputs a second signal (e.g., an off signal) if the brake pedal is released is provided in the brake pedal 21.

The structure of the ECU shown in FIG. 1 is as follows. The current supplied to the linear valve 31 of the pressure apply unit 12 is controlled by the ECU 18 in response to the pedal depression force or the condition of the vehicle. The master cylinder pressure is pressurized automatically by changing the fluid pressure (the third chamber pressure P3) introduced into the third pressure chamber 28 of the master cylinder 20 by the pressure apply unit 12 and the braking force of each wheel in response to the vehicle condition is controlled by driving or operating the fluid pressure control apparatus 17 under the control of the ECU 18.

The ECU 18 is an electric control unit mainly comprised of micro computers. More specifically, the ECU 18 is comprised of a CPU (central processing unit) 70, a RAM (random access memory) 71, a ROM (read only memory) 72, an input circuit portion 73 and an output circuit portion 74.

The fluid pressure sensor 62, the stop lamp switch 67, and the wheel speed sensors 63, 64, 65, 66 are connected to the input circuit portion 73. A steering angle sensor 81 detecting the steering angle, a vehicle acceleration sensor 82 detecting the acceleration in the longitudinal or the lateral direction of the vehicle, and a yaw rate sensor 83 detecting the yaw rate generated in the vehicle are also connected with the input circuit portion 73.

The motor 30 and the linear valve 31 of the pressure apply unit 12, and the holding valves 33a, 34a, 35a, 36a, the pressure reducing valves 33b, 34b, 35b, 36b and the motor 40 of the fluid pressure control apparatus 17 are connected to the output circuit portion 74.

The vehicle condition (the amount of the vehicle condition) during steering operation under vehicle turning is detected by the wheel speed sensors 63–66, and the sensors 81–83. In the vehicle stability control portion 75 operated by the calculation or operation of the CPU 70 based on the detected result, the vehicle stability control controlling the braking force of each wheel respectively in order to decrease the difference between the vehicle target running line (target vehicle path) and the actual vehicle running line (actual vehicle path) during steering such as vehicle turning. The vehicle stability control portion 75 controls the value of the control signal (current value I) outputted to the motor 30 of the pressure apply unit 12 and the linear valve 31 in response to the detected amount of the vehicle condition. Additionally, the vehicle stability control portion 75 controls various devices such as the holding valves 33a–36a, the pressure decrease valves 33b–36b, and the motor 40.

A pedal input pressure estimate portion 76 estimating the pedal input pressure (Pmcin) in response to the pedal depression force amplified in the vacuum booster 19 is provided in the ECU 18. The pedal input pressure estimate portion 76 is operated by the calculation or operation of the CPU 70.

Moreover, the ECU 18 is provided with an anti skid control portion controlling the fluid pressure device 17 for controlling the braking force applied to each wheel to prevent the locking of the wheels during the vehicle braking operation and a traction control portion controlling the pressure apply unit 12 and the fluid pressure device 17 for applying the braking force to the driving wheels to prevent the slipping of the driving wheels during vehicle driving.

Figure 3:
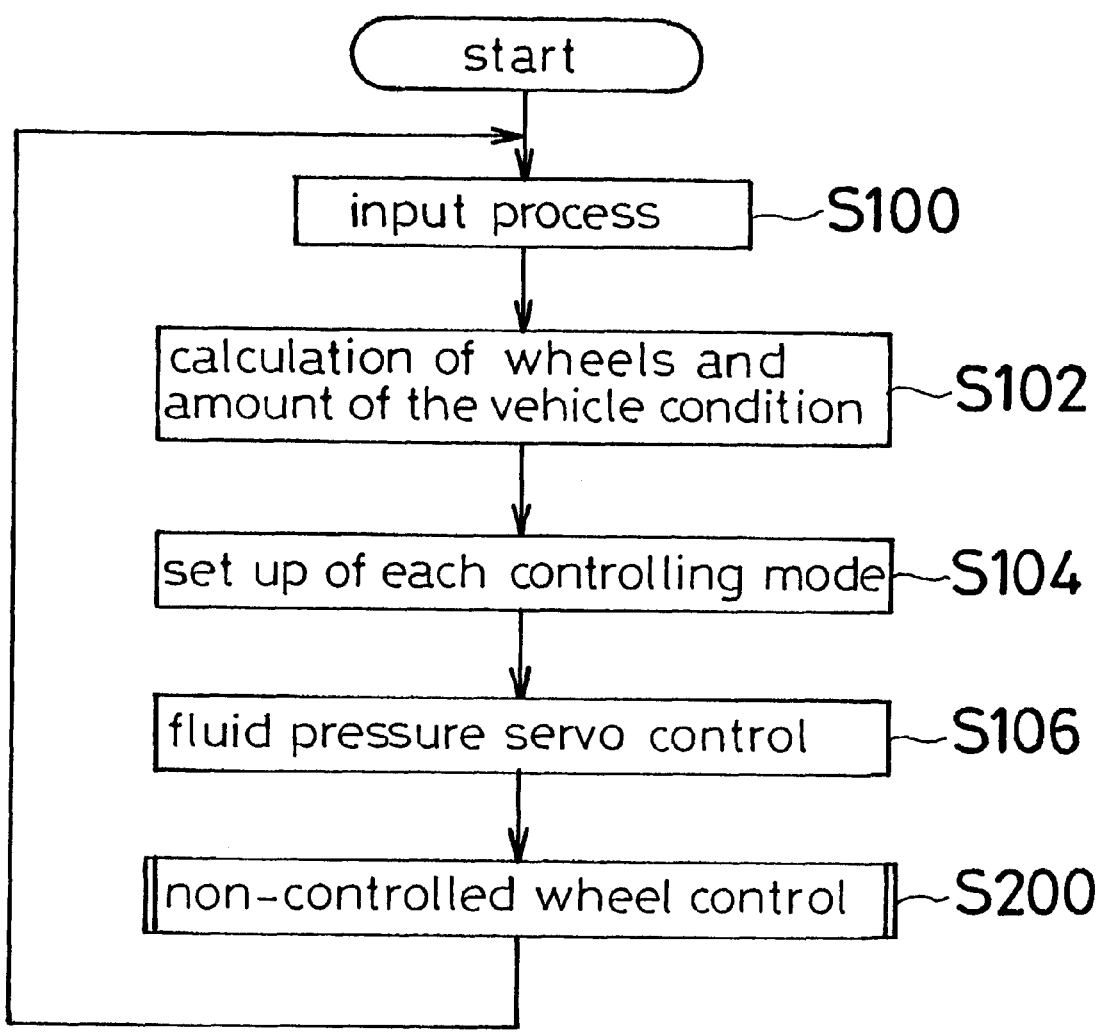
FIG. 3 is a flow chart of the main operation of the braking control apparatus according to the first embodiment of the present invention.

Referring to FIG. 3, the process or program carried out by the ECU and the operation of the vehicle braking control apparatus in accordance with the present invention is as follows. The routine shown in the flowchart of FIG. 3 starts when the ignition switch of the vehicle is turned on. At this time, any necessary initial set up is performed. In step S1OO, an input process is carried out in which the detected signals outputted by the fluid pressure sensor 62, the stop lamp switch 67, the wheel speed sensor 63–66, the steering angle sensor 81, the vehicle acceleration sensor 82, and the yaw rate sensor 83 are read.

Next, in step S102, the wheel speed of each wheel, the wheel acceleration, the estimated vehicle speeds at the gravitational center position of the vehicle and at each wheel position, and the actual slip ratio of each wheel are computed. In step S104, the various control modes such as the anti-skid control and the vehicle stability control are set up and a target slip ratio for the various control modes is set up.

Then, in step S106, the pressure apply unit 12 and the fluid pressure control apparatus 17 are properly controlled in response to the various control modes and the braking force applied to each wheel is appropriately controlled. After step S106, a non-controlled wheel control, which is discussed in more detail below, is performed in step S200 and then the program returns to step S100. The above-described process is repeated at a predetermined period or interval in the ECU 18.

The non-controlled wheel control of step S200 in FIG. 3 is performed in the following manner with reference to FIG. 4 and FIG. 5. In step S202, the system determines whether or not the vehicle stability control is under operation based on the amount of the vehicle condition calculated from the detected value of each of the sensors 63–66 and each of the sensors 81–83 from the inputting process. If it is determined that the vehicle stability control is under operation, the program proceeds to step S204. If the system judges that the vehicle stability control is not under operation, the program returns to step S100 shown in FIG. 3.

In step S204, the third chamber pressure P3, namely the fluid pressure of the third pressure chamber 28 of the master cylinder 20 introduced by the pressure apply unit 12, is estimated by calculation through use of the below formula (1) based on the current value I of the control signal which the ECU 18 outputs to the linear valve 31.

$$P3=F(I) \quad (1)$$

The term F(I) refers to the function of the fluid pressure with respect to the current valve, corresponding to the characteristic of the linear valve 31 between the fluid pressure (P3) and the current value.

After estimating the third chamber pressure P3, the program proceeds to step S206 at which the third chamber servo pressure Pmc3 generated in the first pressure chamber 24 by the first piston 23 pushed by the third chamber pressure P3 is calculated using the formula (2) below based on the third chamber pressure P3 calculated in step S204 and the pressure receiving area ratio A of the first piston 23 mentioned above.

$$Pmc3=P3/A \quad (2)$$

Afterward, in step S208, the pedal input pressure Pmcin generated in the first pressure chamber 24 in response to the pedal depression force amplified in the vacuum booster 19 when the brake pedal 21 is depressed during the vehicle stability control is estimated by calculation through use of the formula (3) below.

$$Pmcin=Pmc-Pmc3 \quad (3)$$

In this formula, Pmc refers to the master cylinder pressure detected by the fluid pressure sensor 62.

The program then moves to step S210 at which it is determined whether or not the fluid pressure control signal (the pressure increase signal) increasing the brake fluid pressure of any wheel cylinder of the control wheels for controlling the vehicle stability control is outputted to the respective holding valve of the wheel cylinder. For instance, if the fluid pressure control signal is outputted from the ECU 18 to the holding valve 35a directing the valve 35a to be off so that the holding valve 35a is open (the pressure increase is outputted) at the time t1 in FIG. 5(a) in order to increase the brake fluid supplied to the wheel cylinder 15 of the wheel RR amongst the three control wheels FL, RR, RF, the routine moves to step S214. If such fluid pressure control signal is not outputted, the program proceeds to step S212.

In step S214, the estimated value of the pedal input pressure Pmcin previously calculated in the step S208 is maintained to be constant. For instance, when the timing is t1 shown in FIG. 5(a), the estimated value of the pedal input pressure Pmcin previously calculated is assured (part C of FIG. 5 (c)). Accordingly, even if the master cylinder pressure Pmc starts to decrease from the time t1 when the holding valve 35a is opened as shown in FIG. 5(b) when the pedal depression force is constant or increased, the fault estimation of the decreasing of the pedal input pressure Pmcin can be prevented.

Next, in step S215, the depression of the brake pedal 21 is judged by judging if the estimated value of the pedal input pressure Pmcin assured in step S214 exceeds a brake judgment threshold value STP. When the pedal input pressure Pmcin is the same or less than the brake judgment threshold value STP, the brake pedal 21 is judged not to be depressed and the program returns to step S100. When the pedal input pressure Pmcin is more than the brake judgment threshold value STP, the brake pedal 21 is judged to be depressed and the program proceeds to step S216.

In step S216, the brake fluid pressure supplied to the wheel cylinder of a non-controlled wheel, the wheel cylinder 13 of the FR for instance, is controlled and the controlling force of the non-controlled wheel is controlled (an outputting process to a W/C based on the estimated value of the pedal input pressure assured in the step S214. More specifically, the holding valve 33a previously energized and closed, for instance, is Unenergizes to be opened and the brake fluid pressure in response to the pedal input pressure Pmcin is supplied to the wheel cylinder 13 of the FR. A duty supplied to the holding valve in this time is calculated by formula (4) below.

$$\text{duty} = \Delta\text{Pmcin}/(\text{Pmc}-\text{Pmcin})\cdot\text{Kgain} \quad (4)$$

In this formula (4), APmcin represents the changing ratio of the pedal depression force Pmcin (the difference between the previously estimated value Pmcin' and the presently estimated value Pmcin) and Kgain represents a conversion constant of the pressure and the duty. After executing step S216, the program returns to step S100.

When the pressure increase output for opening any of the holding valves of the control wheels (the holding valve 33a for instance) is ended, that is when the fluid pressure control signal outputted to the holding valve 35a is turned on from off (time T1 in FIG. 5 (a)), the program moves to step S212 from step S210. At step S212, the system determines whether or not the time after pressure increase outputting is within a predetermined time test (test=50 msec for instance). For instance, in FIG. 5 (a), it is determined whether or not the predetermined time test has elapsed since the ending time T1 of the pressure increase outputting. When it is judged that the time since the ending time T1 of the pressure increase outputting is within the predetermined time, the program moves to step S218. When it is judged that the time since the ending of the pressure increase outputting is not within the predetermined time, the program proceeds to step S215 and then moves back to step S100 after operating the outputting process to the W/C.

In step S218, it is determined whether or not the changing ratio of the master cylinder pressure Pmc is negative, that is whether the master cylinder pressure Pmc turns to an increase from a decrease. When the master cylinder pressure Pme begins to increase from a decreasing state and the changing ratio turns to positive (part B in FIG. 5 (b)), the program moves to step S214 because the pressure Pmc starts to increase by the brake fluid discharged from the pump 29 while the pedal depression force is constant. Then the estimated value of the pedal input pressure Pmein calculated previously is assured.

The routine then advances to step S215 and the above mentioned control judgment is operated. When the brake depression Pmcin is the same or less than the control threshold value STP, the brake pedal 21 is judged not to be depressed and the routine returns to step S100. When the brake depression Pmcin is more than the control threshold value STP, the brake pedal 21 is judged to be depressed and the program advances to step S216. Then, after operating the outputting process to the W/C, the program returns to step S100.

In step S218, when the master cylinder pressure Pmc continues to be decreased and the changing ratio of the pressure is still negative (part D in FIG. 5 (d)), the program moves to step S220 because the driver has released the brake pedal 21 and it is determined that the pedal depression force is starting to decrease. In step S220, the pedal input pressure Pmcin is decreased from the estimated value calculated previously (part E part in FIG. 5 (e)). After that, the program advances to step S215 where the depression of the brake pedal is judged as described previously. Here, the brake fluid pressure supplied to the wheel cylinders of the non-controlled wheels, the wheel cylinder 13 of the FR for instance, is controlled based on the estimated value of the pedal input pressure Pmcin decreased in step S220 and the braking force of the non-controlled wheels is controlled. The program then proceeds back to step S100. The routine described above is carried out every predetermined time period or interval.

According to the present invention, when the brake pedal 21 is depressed during vehicle stability control, the pedal input pressure Pmcin in response to the pedal depression force amplified in the vacuum booster 19 is estimated correctly based on the current value I of the control signal outputted to the linear valve 31 and the master cylinder pressure Pmc detected by the fluid pressure sensor 62. Concurrently, the controlling force of the non-controlled wheels during the vehicle stability control is controlled based on the estimated value. Accordingly, even during the vehicle stability control, the vehicle is able to be decelerated in response to the pedal depression force, thus providing deceleration without any undesirable feeling for the driver. Consequently, when the driver depresses the brake pedal 21 to effect deceleration during vehicle stability control, the controlling force which satisfies the deceleration demand to the non-controlled wheels is able to be generated.

When pressure increase signal amplifying the brake fluid pressure of any of the wheel cylinders 13–16 of each wheel is outputted during vehicle stability control and under braking, the estimated value of the pedal input pressure Pmcin previously calculated (at step S208) is maintained to be constant. Accordingly, even if the master cylinder pressure Pmc starts to decrease by virtue of fluid consumption in the wheel cylinders by the opening of the holding valves receiving a pressure increase signal while the pedal depression force is constant or being increased, the fault judgment in which the pedal input pressure Pmcin is judged to be decreased can be prevented. Consequently, when the pressure increase signal is outputted during the vehicle stability control, the pedal input pressure Pmcin is estimated correctly. Then the braking force which satisfies the deceleration demand to the non-controlled wheels can be generated.

When the master cylinder pressure Pmc turns to increase from decreasing (i.e., begins to increase after decreasing) within the predetermined period from the ending of the pressure increase outputting, the estimated value of the pedal input pressure Pmcin calculated previously is assured because the pressure Pmc is judged to start increasing by the brake fluid discharged from the pump 29 while the pedal depression force is constant. In contrast, when the master cylinder pressure Pmc keeps decreasing within the predetermined period, the pedal input pressure Pmcin is decreased from the estimated value calculated previously because the driver releases the brake pedal 21 and the pedal depression force is judged to be decreasing. As a result, whether or not the brake pedal is still being depressed is judged after the ending of the pressure increase output and the braking force of the non-controlled wheels is generated more accurately.

After the end of the pressure increase output, it is accurately determined whether the master cylinder pressure Pmc restored by the discharge from the pump 41, 44 begins to increase or the pedal depression force itself goes down and the pressure Pmc keeps decreasing because the predetermined period after the ending of the pressure increase output is made to be variable in response to the period of pressure increase output (the period from t1 to T1 in FIG. 5 (a)).

Figure 6:
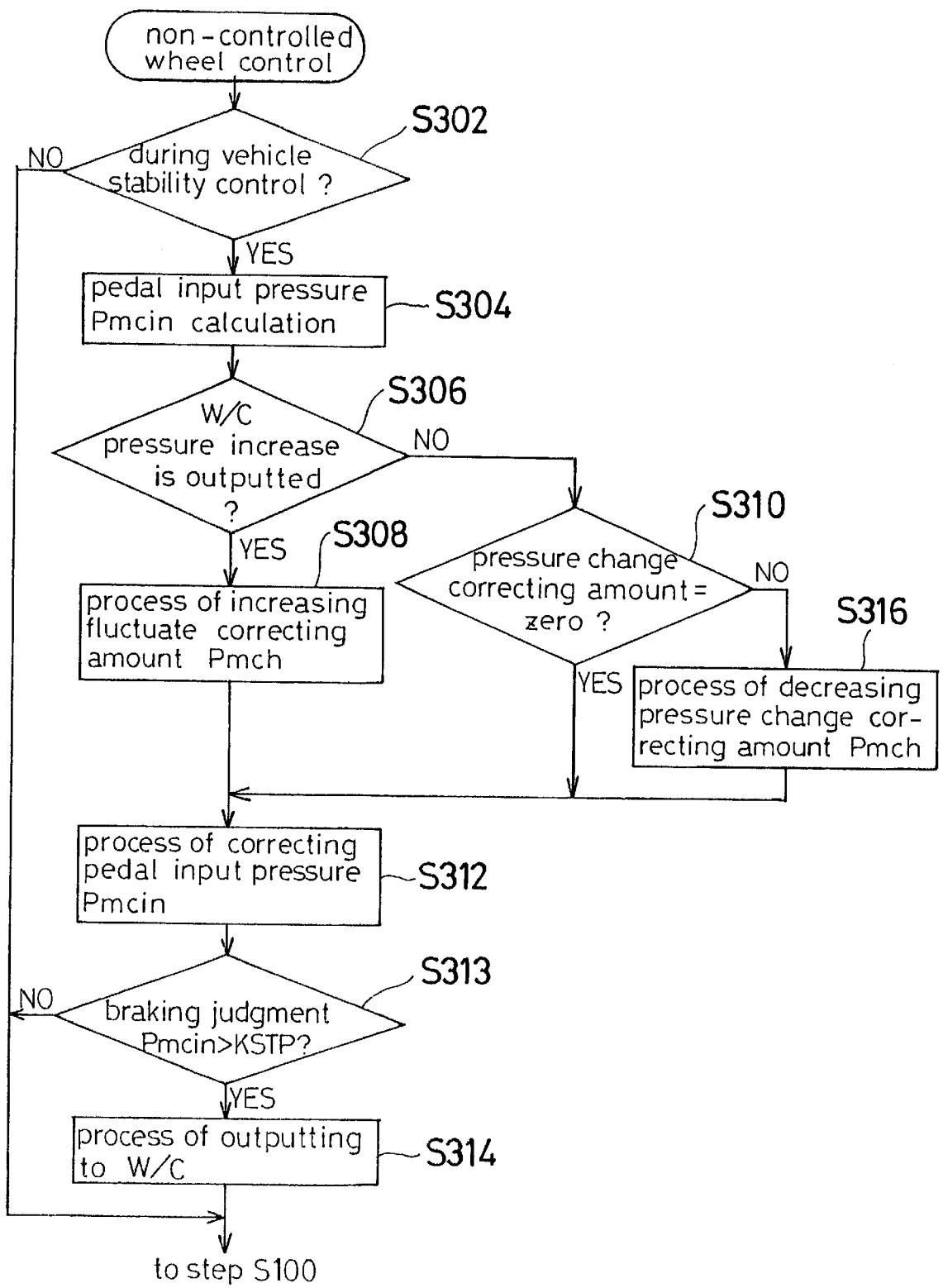
FIG. 6 is a flow chart similar to FIG. 4, but showing the operation of the control for the non-controlled wheels according to the second embodiment of the present invention.

A vehicle braking control apparatus according to a second preferred embodiment of the present invention is illustrated in FIGS. 6 and 7. The second embodiment is similar to the first embodiment, except that the non-controlled wheels control is different from that of the first embodiment. In this second embodiment, in the pedal input pressure estimate portion 76, when the pressure increase signal is outputted during the vehicle stability control and under braking, a pressure change correction amount Pmch is increased (as described below at step S308), and the value which is produced by adding the pressure change correction amount Pmch to the estimated value Pmcin of the pedal input pressure (calculated at step S304) which is decreased in response to the decreasing of the master cylinder pressure Pmc during the outputting period of the pressure increase signal is applied as the corrected estimated value Pmcin of the pedal input pressure (calculated at step S312). The other structure and features associated with this second embodiment are the same as those described above in connection with the first embodiment.

The performed by the ECU 18 in the second preferred embodiment is illustrated in FIGS. 6 and 7. In the routine shown in the flowchart of FIG. 6, steps S300, S302 and S104 are the same as steps S200, S202 and S208 shown in FIG. 4 and described above and so the explanation is not repeated again here. In step S306, it is determined whether or not the pressure increase signal is outputted to the holding valve of any wheel cylinder of the control wheels. This is performed similar to step S210 in FIG. 4. When the pressure increase is outputted after outputting the pressure increase signal (t1 shown in FIG. 7(a) for instance), the program proceeds to step S308. When the pressure increase output ends (t2 shown in FIG. 7(a) for instance), the routine advances to step S310.

In step S308, the pressure change correction amount Pmch is increased from t1 as shown in FIG. 7(c). After that, the program moves to step S312 and a correcting process is performed adding the pedal input pressure Pmcin estimated in step S304 to the pressure change correction amount estimated in step S308. In response to the correction, the pedal input pressure Pmcin is estimated to the value which is not influenced by the decreasing of the decreasing master cylinder pressure Pmc shown in FIG. 7(b). That is, the pedal input pressure Pmc is not estimated to the decreasing value shown as the dashed lines in FIGS. 7(d) and 7(e) in response to the decreasing of the master cylinder pressure Pmc, but is estimated to the value which is not influenced by the decreasing of the decreasing master cylinder pressure Pmc shown as the solid line in FIG. 7(d) when the pedal depression force is increasing, and shown as a solid line in FIG. 7(e) when the pedal depression force is constant.

The routine then advances to step S313 and it is judged whether or not the brake pedal 21 is depressed by the judging whether or not the pedal input pressure Pmcin exceeds the brake judgment threshold value KSTP. When the pedal input pressure Pmcin is the same as or less than the brake judgment threshold value KSTP, the routine goes back to step S100 because the brake pedal 21 is judged to not be depressed. When the pedal input pressure Pmcin is more than the brake judgment threshold value KSTP, the program advances to step S314 because the brake pedal 21 is judged to be depressed.

Figure 4:
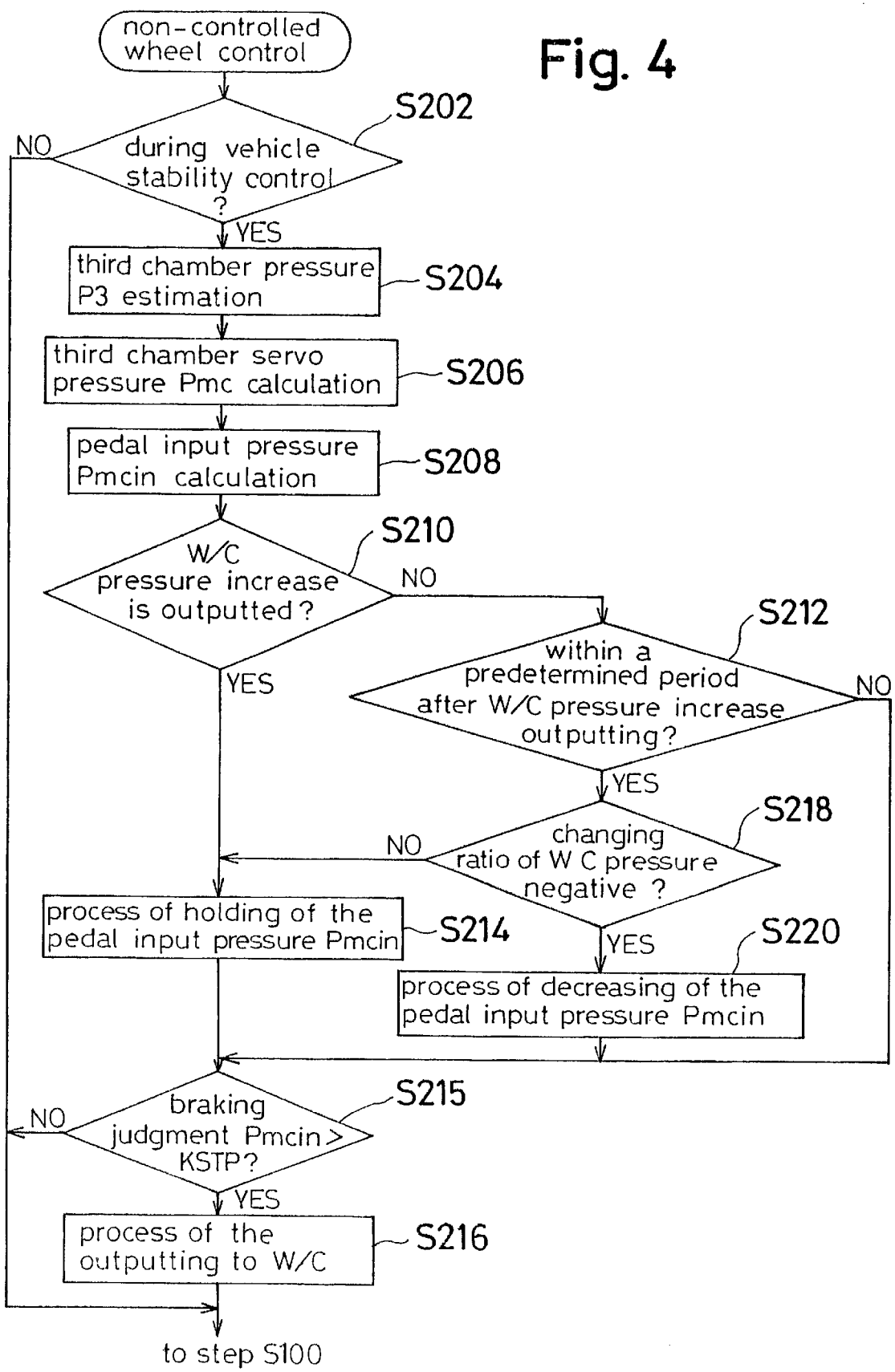
FIG. 4 is a flow chart of the operation of the control for the non-controlled wheels according to the first embodiment of the present invention.

At step S314, the outputting process to the W/C is operated based on the estimated value of the pedal input depression after the correction in a manner similar to step S216 in FIG. 4. After executing step S314, the routine returns to step S100.

When the output of the pressure increase signal is ended (t2 of FIG. 7(a)), the program advances to step S310 from step S306. Here it is determined whether or not the pressure change correction amount is zero. Because the pressure change correction amount is not zero immediately after the output of the pressure increase signal, the program advances to step S316 and the pressure change correction amount is decreased. That is, the pressure change correction amount is being decreased gradually from t2 as shown in FIG. 7(c). Then, in step S312, the decreased pressure change correction amount is added to the pedal input pressure Pmcin estimated in step S304 and the value is estimated as the pedal input pressure Pmcin after correcting. The pressure change correction amount added to the pedal input pressure Pmcin is capable of being decreased in response to the switching of the master cylinder pressure Pmc to an increasing amount from t2 by the correcting process and the pedal input pressure Pmcin is capable of being estimated to the value which is not influenced by the decreasing of the master cylinder pressure Pmc. The program then advances to step S313 and returns to step S100 when the pedal input pressure Pmcin is the same as or less than the brake judgment threshold value KSTP. When the pedal input pressure Pmcin is determined to be more than the brake judgment threshold value KSTP in step S313, the outputting process is operated based on the estimated value of the pedal input pressure Pmcin after the correction, and the program returns to step S100.

After the pressure increase output is ended, the decreasing process of step S316 is carried out until the pressure change correction amount becomes zero (up to t3 shown in FIG. 7(c)). When the pressure change correction amount becomes zero, the program moves to step S312 from step S310. Accordingly, the processes of the step S308 and the step S316 are not operated until the next pressure increase signal is outputted. In step S312, the pressure change correction amount that is used in the correction is zero. The routine described above is carried out at a predetermined period or time interval.

The increasing ratio of the pressure change correction amount could vary in response to the detected value of the master cylinder pressure at that time and one of the detected value or the estimated value of the wheel cylinder pressure of the wheel cylinder to which the pressure increase output is outputted at that time. The decreasing ratio of the pressure change correction amount can be set in response to the capacity of the pressure increasing rate of the pump 29.

According to the second embodiment of the present invention, the pedal input pressure after the correction is estimated to a correct value which is not influenced by the pressure changing master cylinder pressure because the pressure change correction amount increased or decreased in response to the pressure change of the master cylinder pressure Pmc is added to the pedal input pressure Pmcin calculated from the master cylinder pressure Pmc. As a result, even if the pressure increase outputting is outputted during vehicle stability control, the pedal input pressure Pmcin is estimated correctly. Then the braking which satisfies the decreasing demand to the non-controlled wheels can be generated.

Figure 8:
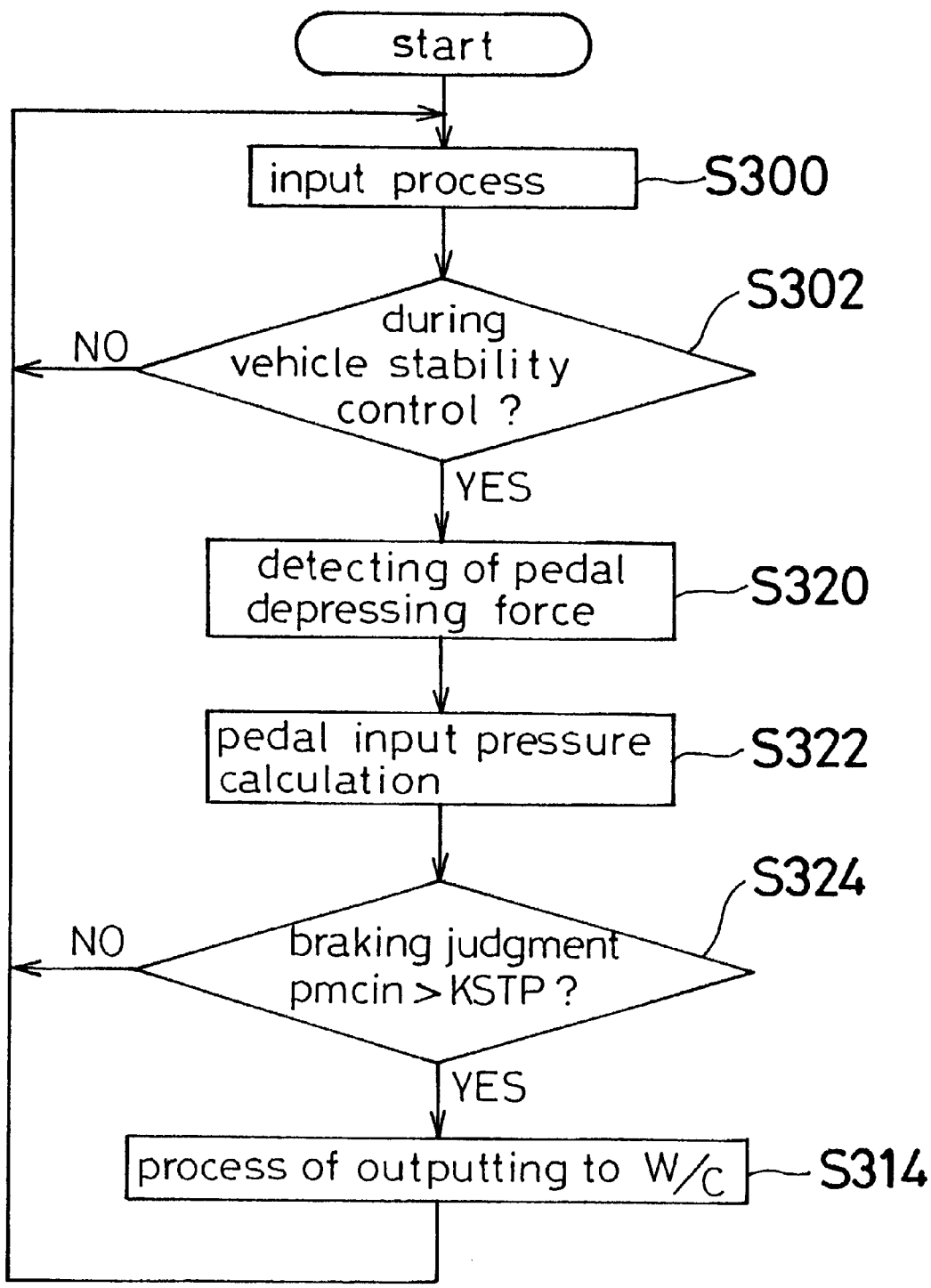
FIG. 8 is a flow chart showing the operation of the control for the noncontrolled wheels according to the second embodiment of the present invention.

The vehicle braking control apparatus according to a third embodiment of the present invention is illustrated in FIG. 8. In the third embodiment, when the brake pedal 21 is depressed during vehicle stability control, the pedal depression force is detected and the pedal input pressure Pmcin in response to the pedal depression force amplified in the vacuum booster 19 is estimated based on the detected value. A depression sensor 85 detecting the pedal depression force is operatively associated with the operating rod 22 for instance. The depression sensor 85 is provided with a distortion sensor detecting the load applied to the operating rod 22 for instance and is connected to the input circuit portion 73 of the ECU 18. Other features and aspects of this embodiment are the same as those described above in connection with the first embodiment.

Referring to FIG. 8, the process or routine carried out by the ECU 18 in this third preferred embodiment is as follows. The routine shown in the flow chart of FIG. 8 includes steps S300 and S302 that are the same as similar steps described above and so a detailed discussion is not repeated here.

In step S302, when it is determined that the vehicle is not under vehicle stability controlling, the program returns to step S300. When it is determined that the vehicle is operating under vehicle stability controlling, the routine advances to step S320. In step S320, the pedal depression force detected by the depression sensor 85 is read. Next, in step S222, the pedal input pressure Pmcin is calculated and estimated based on the amplification ratio between the pedal depression force detected by the depression sensor 85 and the known value of the pedal depression force associated with the vacuum booster 19 operation, namely the booster ratio.

The program then proceeds to step S324. Here, if it determined that the pedal input pressure Pmcin is the same as or less than the brake judgment threshold value KSTP, the routine returns to step S300. When the pedal input pressure Pmcin is more than the brake judgment threshold value KSTP, the program advances to step S314. Then the brake fluid supplied to the wheel cylinders of the non-controlled wheels during vehicle stability control is controlled and the braking of the non-controlled wheels is controlled (the outputting process to the W/C) based on the estimated value of the pedal input pressure Pmcin detected in step S322.

After that, the program returns to step S300. This routine is operated or carried out at a predetermined period or time interval.

There are several advantages associated with this third embodiment. For example, the pedal input pressure Pmcin is estimated correctly based on the amplification ratio between the pedal depression force detected in the depression sensor 85 and the known value of the pedal depression force by the vacuum booster 19, namely the booster ratio. Accordingly, as in the other embodiments, when the brake pedal 21 is depressed by the deceleration demand of the driver during vehicle stability control without considering the pressure change of the master cylinder pressure Pmc by the output of the pressure increase signal, the braking force satisfying the deceleration demand to the non-controlled wheels is generated while continuing the control.

In addition, it is possible to correctly judge or determine whether or not the pedal is depressed. Also, the detecting signal of the depression sensor 85 can be used as a signal which stops the traction control (TRC control). That is, the detecting signal of the depression sensor is available for use in judging whether or not the brake pedal 21 is depressed.

In the embodiments described above, a fluid pressure sensor detecting the fluid pressure of the third pressure chamber 28 (the third chamber pressure P3) of the master cylinder 20 can be provided and the third chamber servo pressure Pmc3 is estimated by the calculation using the previously shown formula (2) from the third chamber pressure P3 detected by the sensor and the area ratio A. Moreover, the pedal input pressure Pmcin can be estimated by the calculation using the formula (3) based on the third chamber servo pressure Pmc3 and the master cylinder pressure Pmc.

As for the brake judgment threshold value KSTP in the various embodiments (step S215 in FIG. 4, step S313 in FIG. 6, step S324 in FIG. 8), the value KSTP can vary in response to the master cylinder pressure at each time. The value KSTP also can be variable in response to a vehicle speed at each time. The value KSTP also can be varied in response to a linear valve outputting current I at each time. Further, the value KSTP also can be varied in response to a driving condition of each solenoid valve (the holding valves and the pressure reducing valves) for the wheel cylinder control.

In each embodiment, the fluid pressure control apparatus 17 connecting the master cylinder 20 with the wheel cylinders 13–16 of each wheel is a front and rear piping system, but a diagonal piping system can be also used. Also, in each embodiment, the pedal depression force can be amplified by the known hydraulic booster in place of the vacuum booster 19. In this case, the fluid pressure generated in the pressure unit 12 in response to the amount of the vehicle condition is introduced into the booster chamber of the hydraulic booster and the booster piston is pushed by the fluid pressure. Accordingly, the brake fluid pressure (the master cylinder pressure Pmc) including the pedal input pressure Pmcin in response to the pedal depression force amplified by the booster and the third chamber servo pressure Pmc3 increased automatically by the fluid pressure in response to the vehicle condition can be generated by the master cylinder.

It is also possible in each embodiment to employ a master cylinder having one piston in place of the tandem master cylinder 20 described.

In the third embodiment, the depression of brake pedal 21 is judged by judging whether or not the estimated pedal input pressure Pmcin exceeds the brake judgment threshold value KSTP. In addition, when the stop lamp switch 67 is turned on, the brake pedal 21 can be judged to be depressed.

In each of the described embodiments, each wheel cylinder is provided with a holding valve and a pressure reducing valve. In place of this construction, each wheel cylinder can be provided with a solenoid valve which is switchable between three positions; a pressure increase condition, a holding condition, and a pressure decrease condition.

As explained above, according to the present invention, when the driver depresses the brake pedal to effect deceleration during vehicle stability control, the braking force which satisfies the deceleration demand to the non-controlled wheels is advantageously capable of being generated. Also, the pedal input pressure is estimated correctly based on the value of the control signal outputted to the pressure apply means and the master cylinder pressure detected in the fluid pressure sensor. Even if the pressure increase output is outputted during vehicle stability control, the pedal input pressure Pmcin is estimated correctly. Then the braking force which satisfies the decreasing demand to the non-controlled wheels is capable of being generated.

Also in accordance with the present invention, it is determined whether or not the brake pedal is still depressed after the pressure increase output. As a result, the braking force of the non-controlled wheels can be generated more correctly. Additionally, the pedal input pressure after the correcting is estimated correctly and is not influenced by the pressure changing master cylinder pressure because the pressure change correcting amount increased or decreased in response to the master cylinder pressure is added to the pedal input pressure estimated from the master cylinder pressure. Accordingly, even if the pressure increase signal is outputted during vehicle stability control, the pedal input pressure Pmcin is estimated correctly. Then the braking force which satisfies the decreasing demand to the non-controlled wheels is generated.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A braking control apparatus for vehicles comprising:
    fluid pressure generating means for generating a brake fluid pressure including a pedal input pressure in response to a pedal depression force and a servo pressure in response to fluid pressure introduced by a pressure apply means;
    fluid supplying means supplying the brake fluid to a wheel cylinder associated with each wheel from a master cylinder;
    control means controlling the fluid pressure introduced by the pressure apply means in response to a vehicle condition and controlling a braking force of each wheel by driving the fluid supplying means in response to the pedal depression force or the vehicle condition;
    pedal input pressure estimating means for estimating the pedal input pressure; and
    the control means controlling a braking force of a non-controlled wheel during vehicle stability control based on the pedal input pressure estimated by the pedal input pressure estimating means.

2. The braking control apparatus for vehicles as defined in claim 1, further comprising
    a fluid pressure sensor detecting a master cylinder pressure of the brake fluid pressure generated in the master cylinder; and
    the pedal input pressure estimating means calculating the servo pressure based on a value of a control signal outputted from the control means to the pressure apply means, and estimating the pedal input pressure by subtracting the calculated value of the servo pressure from that of the master cylinder pressure.

3. The braking control apparatus for vehicles as defined in claim 1, wherein the pedal input pressure estimating means holds an estimated value of the pedal input pressure calculated previously when a pressure increase signal increasing brake fluid pressure of the wheel cylinder of any wheel is outputted during the vehicle stability control, and the control means controls the braking force of the non-controlled wheel based on the estimated value of the pedal input pressure held previously.

4. The braking control apparatus for vehicles as defined in claim 3, wherein the pedal input pressure estimating means holds the estimated value of the pedal input pressure when the master cylinder pressure detected by the fluid pressure sensor turns to increasing while a predetermined period has passed from an end of the output of the pressure increase signal, and estimates the value decreased by a predetermined value from the estimated value of the pedal input pressure held previously when the master cylinder pressure continues to decrease.

5. The braking control apparatus for vehicles as defined in claim 3, wherein the pedal input pressure estimating means increases a pressure change correcting amount added to the estimated value of the pedal input pressure calculated previously when the pressure increase signal is outputted, and decreases the pressure change correcting amount after the end of the outputting of the pressure increase signal.

6. A method of controlling brake fluid to wheel cylinders associated with respective wheels of a vehicle, comprising:
    generating brake fluid pressure in a master cylinder that includes a pedal input pressure in response to a brake pedal depression force and a servo pressure in response to fluid pressure introduced by a pump;
    supplying the brake fluid pressure to the wheel cylinders from the master cylinder;
    controlling the fluid pressure introduced by the pump in response to a vehicle condition and controlling a braking force applied to the wheel cylinders of the wheels in response to the brake pedal depression force or the vehicle condition;
    estimating a pedal input pressure; and
    controlling a braking force applied to a non-controlled wheel during vehicle stability control based on the estimated pedal input pressure.

7. The method as defined in claim 6, including detecting a master cylinder pressure of the brake fluid pressure generated in the master cylinder, calculating the servo pressure based on a value of a control signal outputted by a controller to the pump, and estimating the pedal input pressure by subtracting the calculated value of the servo pressure from that of the master cylinder pressure.

8. The method as defined in claim 6, including holding an estimated value of the pedal input pressure calculated previously when a pressure increase signal of the wheel cylinder of any wheel is outputted during vehicle stability control, and controlling the braking force of the non-controlled wheel based on the estimated value of the pedal input pressure held previously.

9. The method as defined in claim 8, wherein the estimated value of the pedal input pressure is held when the detected master cylinder pressure turns to increasing while a predetermined period has passed from an end of an output of the pressure increase signal, and estimating the value decreased by a predetermined value from the estimated value of the pedal input pressure held previously when the master cylinder pressure continues to decrease.

10. The method as defined in claim 8, including increasing a pressure change correcting amount added to the estimated value of the pedal input pressure calculated previously when the pressure increase signal is outputted, and decreasing the pressure change correcting amount after an end of the outputting of the pressure increase signal.

* * * * *